United States Patent

Liang et al.

[11] Patent Number: 5,970,653
[45] Date of Patent: Oct. 26, 1999

[54] COLLAPSABLE PLANT SHELTER

[76] Inventors: Daolin Liang, 205 Lakewood Drive, Vancouver, Canada, V5L 4L1; Richard Allan Dunn, 1872 12th Avenue, Prince George, Canada, V2M 1P7

[21] Appl. No.: 08/918,426

[22] Filed: Aug. 26, 1997

[51] Int. Cl.[6] ............................................ A01G 13/02
[52] U.S. Cl. ........................................................ 47/30
[58] Field of Search ................................. 47/23, 24, 26, 47/30

[56] References Cited

U.S. PATENT DOCUMENTS

| | | | |
|---|---|---|---|
| 2,005,326 | 6/1935 | Schindler | 47/26 |
| 2,062,789 | 12/1936 | Keller | 47/26 |
| 2,191,808 | 2/1940 | Schramm | 47/26 |
| 4,899,486 | 2/1990 | Hurlstone . | |
| 4,903,431 | 2/1990 | Stoll . | |
| 5,090,155 | 2/1992 | Rodgers . | |
| 5,222,325 | 6/1993 | Angus . | |
| 5,323,566 | 6/1994 | Mills . | |
| 5,345,711 | 9/1994 | Friesner . | |
| 5,347,750 | 9/1994 | Mills . | |
| 5,361,535 | 11/1994 | Morasiewicz . | |
| 5,375,368 | 12/1994 | Motz, Jr. . | |
| 5,426,887 | 6/1995 | Spencer et al. . | |
| 5,471,783 | 12/1995 | McLean . | |
| 5,479,741 | 1/1996 | Underwood . | |
| 5,505,020 | 4/1996 | North . | |
| 5,509,229 | 4/1996 | Thomasson et al. . | |
| 5,513,466 | 5/1996 | Mercier | 47/23 |

FOREIGN PATENT DOCUMENTS

| | | |
|---|---|---|
| 885726 | 11/1971 | Canada . |
| 1307114 | 9/1992 | Canada . |

*Primary Examiner*—Thomas Price
*Attorney, Agent, or Firm*—Smart & Biggar

[57] ABSTRACT

The invention provides a shelter comprising a wall member, a support ring to hold the wall member in its expanded conformation and, optionally, a ground support member to support the shelter on the ground. The wall member is adapted to have a flattened collapsable conformation or an expanded conformation. In use, the wall member is in the expanded conformation in which the wall member circumferentially encloses an interior space and defines an open bottom. The interior space accommodates the plant to be protected. The expanded shape of the wall member may be conical, with an opening at the top. The support ring retains the wall member in its expanded conformation by abutting an exterior surface of the wall member. The support ring has a decomposable portion adapted to deteriorate over time.

18 Claims, 4 Drawing Sheets

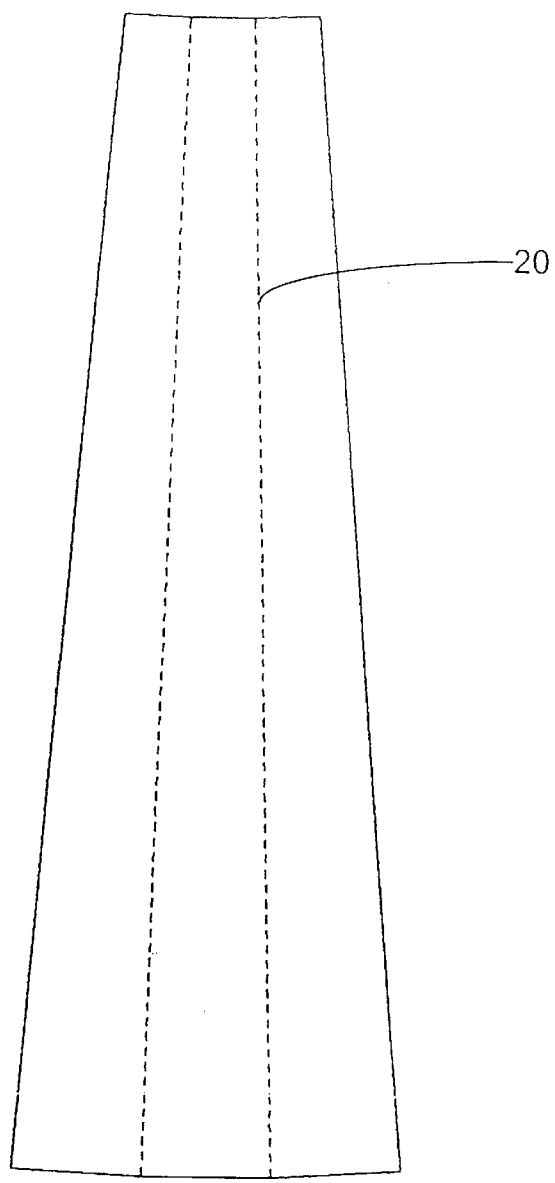
Fig. 1
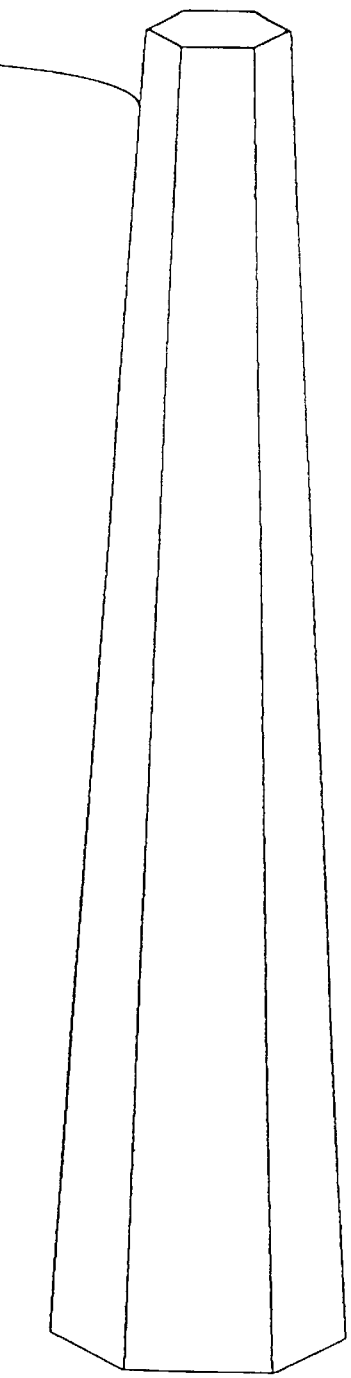
Fig. 2
Fig. 3

5,970,653

COLLAPSABLE PLANT SHELTER

FIELD OF THE INVENTION

The invention is in the field of structures for sheltering plants, particularly tree protectors.

BACKGROUND OF THE INVENTION

In many circumstances plants require protection from the depredations of herbivores. This is particularly true of immature plants that may require a period of protection to establish themselves.

The forestry industry engages in extensive reforestation efforts to ensure a sustainable harvest of trees. Significant efforts are therefore devoted to the aspects of forestry that involve the development, cultivation and reproduction of forest trees (a branch of forestry science known as silviculture).

Reforestation of coniferous and deciduous forests involves the planting of hundreds of thousands of tree seedlings every year. Silviculturists recognize a need to protect such seedlings from deer and other herbivores for a period of time to optimize success of their reforestation efforts. Plant shelters known as tree protectors have been used for this purpose for some time. Given the scale of reforestation efforts, there is a need to minimize the unit costs of tree protectors.

In many cases, reforestation takes place in remote areas. Transporting seedlings and tree protectors to such areas can be expensive. Another significant component of the cost of reforestation efforts is the cost of labour. There is accordingly a need for tree protectors that are economical to transport, install and maintain.

In some cases, it may be advantageous to protect seedlings for more than a year. It may accordingly be preferred to have tree protectors that are hardy enough to withstand environmental assaults such as wind, rain, snow and sunlight over an extended period of time. Suitably durable tree protectors will have the benefit of minimizing the costs associated with maintaining a reforested area.

The health of replanted seedling depends on a number of factors, including the availability of light and appropriate ventilation. Seedlings can suffer from a variety of plant diseases, some of which may be encouraged by tree protectors that preclude adequate ventilation of the seedlings or confine the growing seedlings too tightly. There is therefore a need for tree protectors that provide for adequate ventilation, illumination and growth of seedlings.

At a certain point in the maturation of seedlings, protective shelters may no longer be necessary or desirable. It may therefore be advantageous to have tree protectors that deteriorate over an appropriate length of time, so that the protectors eventually fall apart and do not confine the growing trees. Tree protectors that self-destruct in this way may obviate the need for the labour intensive removal of the protectors once the seedlings are sufficiently mature.

SUMMARY OF THE INVENTION

The invention provides a shelter comprising a wall member, a support ring to hold the wall member in an expanded conformation and, optionally, a ground support member to support the shelter on the ground.

The wall member is adapted to have a flattened collapsable conformation or an expanded conformation. In use, the wall member is in the expanded conformation in which the wall member circumferentially encloses an interior space and defines an open bottom. The interior space accommodates the plant to be protected. The expanded shape of the wall member may be conical, with an opening at the top.

The wall member may be formed from a creased sheet of material, the creases forming fold lines along which the wall member flexes to adopt its flattened conformation or its expanded conformation. The sheet of material forming the wall may be polyethylene board.

Ventilation holes may be provided in the wall member. The size of the ventilation holes may be graduated so that they are larger towards the bottom of the wall member.

One or more support rings retain the wall member in its expanded conformation by engaging the wall member. The support ring may engage the wall member by abutting an exterior surface of the wall member. The support ring may have a decomposable portion adapted to deteriorate over a shorter period of time than other portions of the ring, so that the ring falls apart within a preselected time frame so that the ring will not impede the growth of the plant enclosed by the shelter (references herein to "a decomposable portion" of the support ring mean a portion of the ring adapted to deteriorate over a shorter period of time than other portions of the ring). Alternatively, the entire ring may be made from a material that decomposes over a time frame that ensures that the ring will not impede the growth of the plant enclosed by the shelter.

The support ring may be made from two bent wires having ends that are joined by the decomposable portion of the ring. An eyelet may be formed in the ends of the bent wires. The eyelet may be used to retain the ground support member and as the point of attachment of the decomposable portion of the ring.

The shelter may be held to the ground by a ground support member that engages a retaining portion of the ring. The ground support member may also engage a retaining portion of the wall member to provide additional support. The retaining portion of the wall member may comprise a retaining aperture in a retaining portion of the wall member. The retaining aperture may be adjacent to a bottom edge of the wall member. The retaining portion of the wall member may be a movable tab, the tab being defined by cuts in the wall member that intersect the bottom edge of the wall member.

The shelter of the invention may also be provided in the form of a kit comprising the wall member, the support ring and optionally the support member.

BRIEF DESCRIPTION OF THE DRAWINGS

FIG. 1 is an isometric view of the shelter in its collapsed, flattened conformation.

FIG. 2 is a top plan view of the shelter in its collapsed, flattened conformation.

FIG. 3 is a side elevational view of the shelter in its expanded conformation.

DETAILED DESCRIPTION OF THE PREFERRED EMBODIMENT

Figure 4:
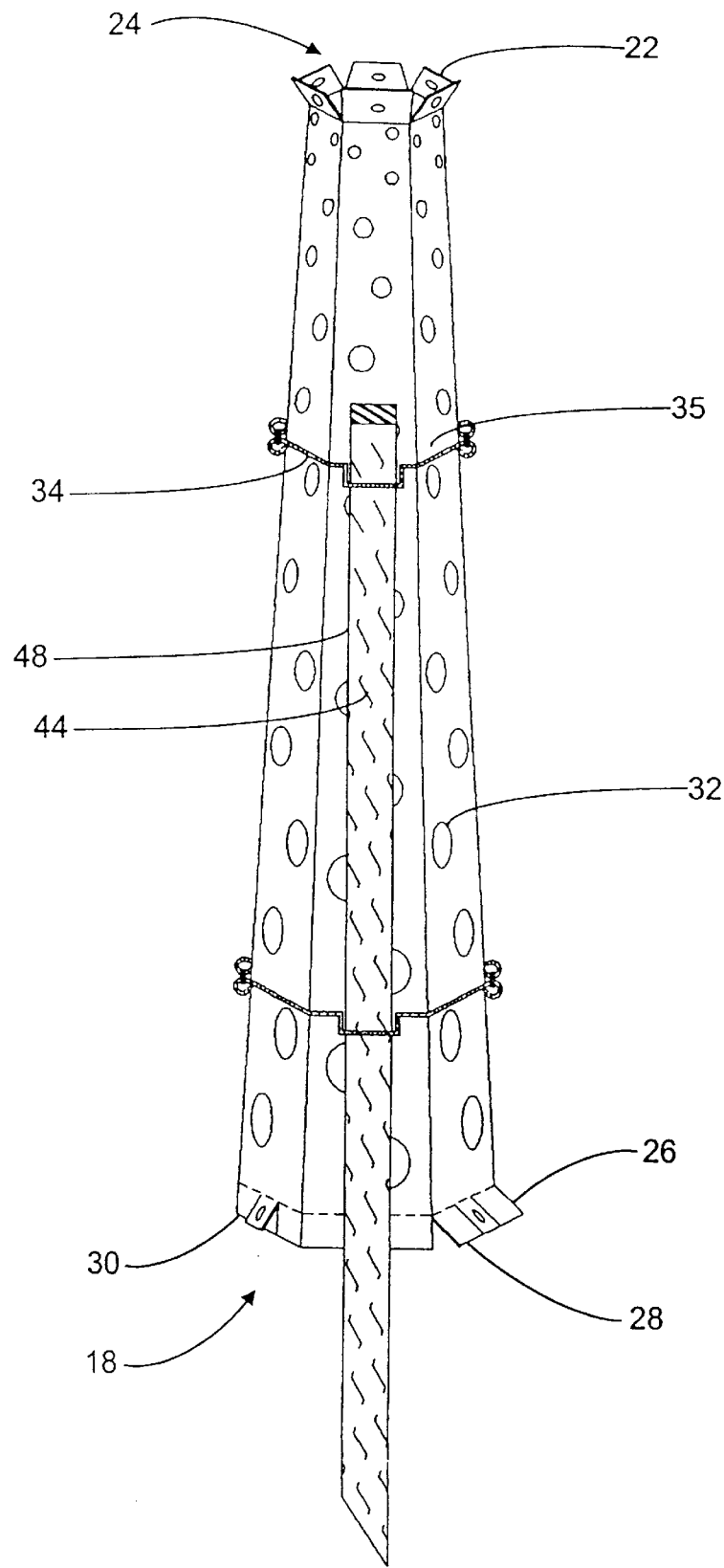
FIG. 4 is a side elevational view of the expanded shelter with two support rings and a stake ground support member.
Figure 5:
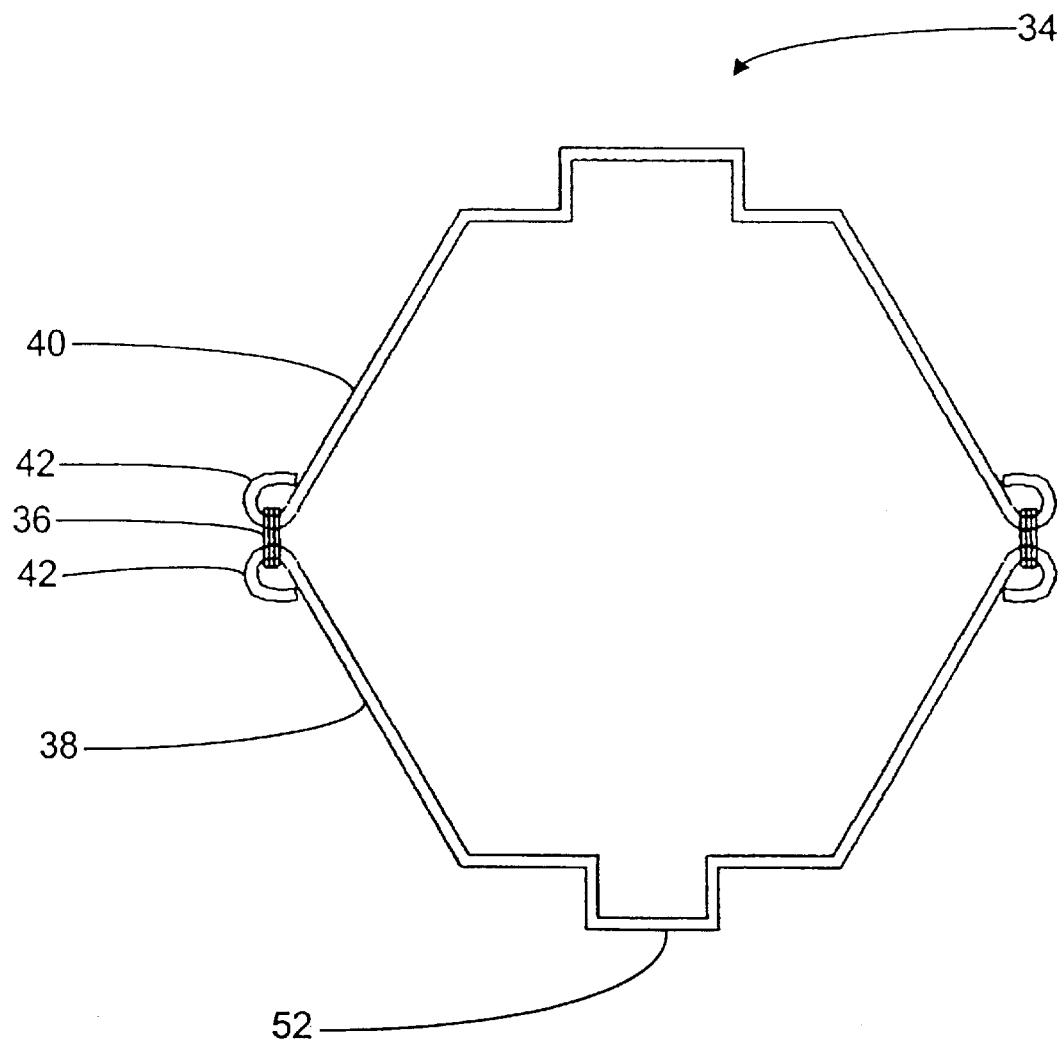
FIG. 5 is a top plan view of a support ring showing the decomposable portions and ground support member retaining portions of the ring.
Figure 6:
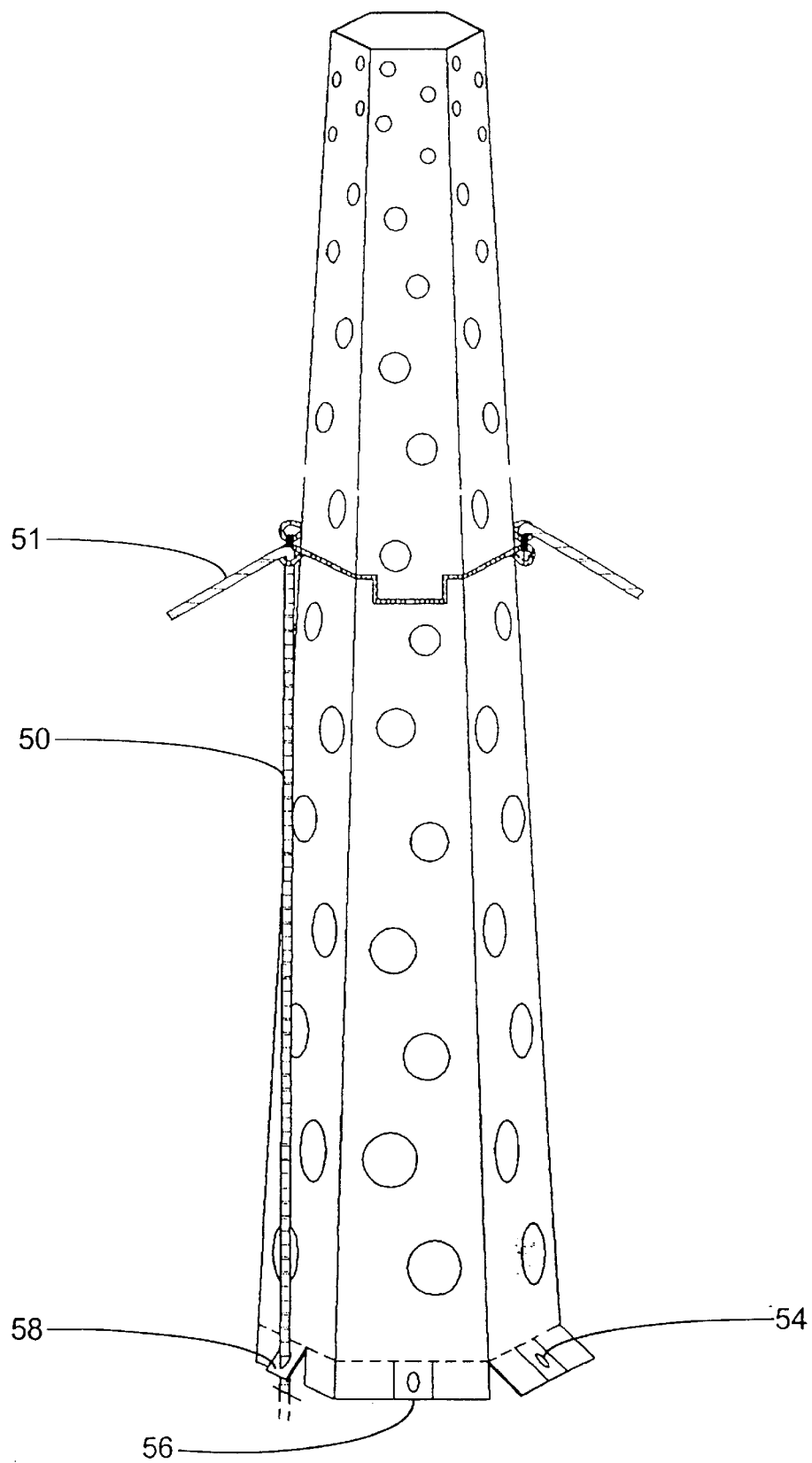
FIG. 6 is a side elevational view of the shelter showing a bent metal rod ground support member.

The invention provides a shelter 10 comprising a collapsable wall member 12 adapted to have a flattened conformation 14 or an expanded conformation 16. In the expanded conformation 16, the wall member 12 circumferentially encloses an interior space and defines an open bottom 18. The wall member 12 may also define an opening 24 at the top of the shelter.

The wall member 12 may be generally conical, thereby enclosing an interior space that is wider at the bottom than at the top of the wall member 12. The horizontal cross-section of the wall member 12 in its expanded conformation 16 may be any of variety of shapes, including circular or hexagonal.

The wall member 12 may be formed from a sheet of creased material, the creases 20 acting as fold lines along which the sheet flexes so that the wall member 12 can adapt between its flattened and expanded conformations 14 & 16 by manual manipulation.

The sheet from which the wall member 12 may be formed may be made from polyethylene board, such as hollow high density polyethylene board (one variety of polyethylene that may be used is sometimes designated in the trade as 5000S). Hollow board may provide beneficial insulating properties. The insulating properties of such board may be adjusted by welding the interior passages closed at the top and bottom edges of the wall member 12. The wall material may have ultraviolet stabilizers added to it (varieties of which are known in the trade as UV 327 and UV2002). The wall material may comprise other additives that act as antioxidants. The transparency of the wall member 12 to light and heat may be vary, depending on the particular requirements of the plants to be protected. The wall member 12 may also comprise material that is biologically degradable or photo-degradable.

The top of the wall member 12 may be cut to provide flaps 22 that can fold away from the interior of the shelter 10. Such flaps 22 may act to reduce the wear on portions of the growing tree that extend above the opening 24 in the top of the shelter 10. When the wall material is hollow board, such as polyethylene board, the crease in the board where the flaps 22 fold outwardly may act to close off the internal passages in the board and thereby improve the insulating properties of the wall member 12.

The bottom of the wall may be cut to provide flaps 26 that can fold away from the interior of the shelter. Such flaps may be used to adapt the shelter 10 to engage uneven ground. For example, on a slope, uphill flaps 28 may be turned out to in effect shorten the wall, while downhill flaps 30 remain unfolded to form a longer wall.

The wall material may be selected so that the shelter 10 of the invention will degrade and fall away from a growing tree at an optimum point in the maturation of the tree. Varying the type and concentration of UV stabilizers in polyethylene board may, for example, provide wall materials of varying durability. Optimum expected life-spans for the protector for some reforestation sites may be in the range of 5 to 6 years.

The wall member 12 may be provided with ventilation holes 32. The size and position of such ventilation holes 32 may be varied to provides shelters with different ventilation characteristics. In tailoring the degree of ventilation in shelters, the requirements of the tree may be considered as well as the need to adapt the shelter 10 to be resistant to being blown over. Such ventilation holes 32 may be graduated so that they are larger near the bottom of the wall member 12. Such ventilation holes 32 may provide a 'chimney' effect, in which air is drawn in through holes near the bottom of the wall member 12 and drawn upwardly within the interior space of the shelter 10 and exhausted through an opening at the top of the shelter 10. Ventilation holes may not be advantageous where it is desired to maximize the insulating properties of the wall member 12.

A support ring 34 is provided to retain the wall member 12 in its expanded conformation 16 by engaging the wall member 12. The support ring 34 may be installed by slipping it over the wall member 12 while the wall member 12 is manually held in its expanded conformation 16. The position of the support ring 34 may then be adjusted so that it abuts an exterior surface 35 of the wall member 12 to retain the wall member 12 in its expanded conformation 16. More than one support ring 34 may be used, as shown in FIG. 2.

In an alternative embodiment (not illustrated), the support ring 34 may fit inside the wall member 12 to hold the wall member 12 in its expanded conformation 16. In such an embodiment, portions of the support ring 34 may protrude through cuts or openings in wall member 12, thereby bringing the support ring 34 into engagement with wall member 12.

The support ring 34 may have a decomposable portion 36 adapted to deteriorate in use more rapidly than other portions of the support ring 34. The decomposable portion 36 of the support ring 34 may for example be made so that it is susceptible to oxidation, photo-degradation or biodegradation.

In one embodiment, a coil of oxidisable wire may be used as the decomposable portion 36 of the support ring 34. Biologically degradable or photo-degradable plastic fasteners are alternative embodiments of the decomposable portion 36 of the support ring 34.

In one embodiment, the decomposable portion 36 of the support ring 34 is adapted to deteriorate within a period of less than ten years of exposure to the elements. In an alternative embodiment, the entire support ring 34 is adapted to deteriorate over a comparable time period.

The decomposition of the support ring 34, or a decomposable portion 36 of the support ring 34, allows the support ring 34 to fall apart so that the support ring 34 does not interfere with the growth of the plant that is enclosed by the shelter 10. To adapt the shelter 10 for use with different plants and under different environmental conditions, various embodiments of the support ring 34 may be provided that deteriorate over a wide range of preselected times under various conditions.

The support ring 34 may be assembled from two bent wires 38 & 40, the ends of the wires being joined by decomposable portions 36 of the support ring 34. The ends of the bent wires may be formed into eyelets 42. The eyelets 42 can function as the portions of the support ring 34 (the retaining portions) that engage a ground support member 44 (discussed below), and as the point of attachment of the wires 38 & 40 to the decomposable portions 36 of the support ring 34.

In alternative embodiments of the support ring 34, the ends of the wires may be adapted to receive a decomposable cotter pin. So that the wires 38 & 40 are released from one another once the cotter pin succumbs to decomposition. The cotter pin may for example be made from oxidisable metal, bio-degradable plastic or photo-degradable plastic.

The ground support member 44 may be provided to hold the shelter 10 in place. To do so, the ground support member 44 engages a retaining portion of the support ring 34. When the ground support member 44 is driven into the ground, it supports the shelter 10 through its engagement with the retaining portion of the support ring 34.

The ground support member 44 may for example be a wooden stake 48 or a metal rod 50. The metal rod 50 may be adapted for use as the ground support member 44 by bending an upper portion 51 of the rod out of alignment with the rest of the metal rod 50, so that the upper portion 51 of the metal rod 50 can act as a hook to hold the wall member 12 down or to hold the support ring 34 down.

The retaining portion of the support ring 34 may be a portion of wire 38 that is bent to facilitate engagement with the ground support member 44. The support ring 34 may be provided, for example, with a bent portion 52 that is adapted to accommodate the wooden stake 48. A multi functional support ring may be provided with multiple retaining portions adapted to engage different kinds of support members.

The shelter 10 may be further supported by the ground support member 44 by engagement between a retaining portion of the wall member 12 and the ground support member 44. The retaining portion of the wall member 12 may be an aperture 54 (the retaining aperture) in a portion of the wall member 12 adjacent to a bottom edge 56 of the wall member 12 (the retaining portion of the wall member). The retaining portion of the wall member 12 may be a movable tab 58 defined by cuts in the wall member, the cuts intersecting the bottom edge 56 of the wall member 12.

The shelter 10 of the invention may be provided in the form of a kit comprising the collapsable wall member 12 and the support ring 34. The support ring 34 of the kit may be dimensioned to match the horizontal cross-section of the expanded wall member 12. The ground support member 44 may also be included in the kit.

As will be apparent to those skilled in the art in the light of the foregoing disclosure, many alterations and modifications are possible in the practice of this invention without departing from the spirit or scope thereof. Embodiments of the shelter 10 of the invention may for example be adapted for use with a variety of plants, such as garden vegetables. Embodiments may also be provided in which the wall member is not collapsable. Accordingly, the scope of the invention is to be construed in accordance with the substance defined by the following claims.

What is claimed is:

1. A shelter comprising:
   a wall member adapted to have a flattened collapsable conformation or an expanded conformation, wherein in the expanded conformation the wall member circumferentially at least partially encloses an interior space and defines an open bottom; and
   a support ring adapted to be applied to the wall member when the wall member is in the expanded conformation to engage the wall member to retain the wall member in the expanded conformation.

2. The shelter of claim 1 wherein the support ring is removable and comprises a decomposable portion, the decomposable portion of the support ring being adapted to deteriorate more rapidly than an other portion of the support ring to allow the support ring to fall apart.

3. The shelter of claim 1 further comprising a ground support member engaging a retaining portion of the ring.

4. The shelter of claim 3 wherein the ground support member engages a retaining portion of the wall member.

5. The shelter of claim 4 wherein the retaining portion of the wall member comprises a retaining aperture in a retaining portion of the wall member adjacent to a bottom edge of the wall member.

6. The shelter of claim 5 wherein the retaining portion of the wall member comprises a movable tab defined by cuts in the wall member, the cuts intersecting the bottom edge of the wall member.

7. The shelter of claim 2 wherein the support ring comprises two wires having ends joined by the decomposable portion of the ring.

8. The shelter of claim 7 wherein an end of one of the bent wires comprises an eyelet, the eyelet comprises the retaining portion of the ring and the decomposable portion of the ring is attached to the eyelet.

9. The shelter of claim 1 wherein the wall member comprises a creased sheet of material, the creases forming fold lines along which the wall member flexes to adopt its flattened conformation or its expanded conformation.

10. The shelter of claim 9 wherein the sheet of material is comprised of polyethylene board.

11. The shelter of claim 1 wherein the wall member comprises ventilation holes.

12. The shelter of claim 11 wherein the ventilation holes are larger towards the bottom of the wall member.

13. A shelter kit comprising:
    a collapsable wall member adapted to have a flattened conformation or an expanded conformation in which the wall member circumferentially encloses an interior space and defines an open bottom; and
    a support ring adapted to be applied to the wall member when the wall member is in the expanded conformation and dimensioned to retain the wall member in the expanded conformation by engaging the wall member in its expanded conformation.

14. The shelter kit of claim 13 wherein the support ring is adapted to be removable from the wall member and comprises a decomposable portion, the decomposable portion of the support ring being adapted to deteriorate more rapidly than an other portion of the support ring to allow the support ring to fall apart.

15. The shelter kit of claim 13 further comprising a support member adapted to engage a retaining portion of the ring, the retaining portion of the ring being adapted to receive and retain the support member.

16. The shelter kit of claim 15 wherein the support member is adapted to engage a retaining portion of the wall member, the retaining portion of the wall member being adapted to receive and retain the support member.

17. A shelter comprising:
    a wall member adapted to have a flattened collapsable conformation or an expanded conformation, the wall member being in the expanded conformation in which the wall member circumferentially encloses an interior space and defines an open bottom; and
    a support ring engaging the wall member to retain the wall member in its expanded conformation, wherein the support ring comprises a decomposable portion, the decomposable portion of the support ring being adapted to deteriorate more rapidly than an other portion of the support ring, wherein the support ring comprises two wires having ends joined by the decomposable portion of the ring.

18. The shelter of claim 17 wherein an end of one of the bent wires comprises an eyelet, the eyelet comprises the retaining portion of the ring and the decomposable portion of the ring is attached to the eyelet.

* * * * *